US012779504B2

(12) United States Patent
Harvey

(10) Patent No.: US 12,779,504 B2
(45) Date of Patent: Nov. 3, 2026

(54) SYSTEM AND METHOD FOR WET TREATMENT OF COMPONENT

(71) Applicant: ROLLS-ROYCE plc, London (GB)

(72) Inventor: Richard C. Harvey, Derby (GB)

(73) Assignee: Rolls-Royce plc, London (GB)

(*) Notice: Subject to any disclaimer, the term of this patent is extended or adjusted under 35 U.S.C. 154(b) by 286 days.

(21) Appl. No.: 18/526,413

(22) Filed: Dec. 1, 2023

(65) Prior Publication Data

US 2024/0207901 A1 Jun. 27, 2024

(30) Foreign Application Priority Data

Dec. 21, 2022 (GB) ...................................... 2219339

(51) Int. Cl.
*B08B 3/02* (2006.01)
*B08B 15/02* (2006.01)

(52) U.S. Cl.
CPC ................ *B08B 3/02* (2013.01); *B08B 15/02* (2013.01)

(58) Field of Classification Search
None
See application file for complete search history.

(56) References Cited

U.S. PATENT DOCUMENTS 5,707,457 A 1/1998 Yates
5,804,507 A 9/1998 Perlov et al.
8,734,596 B1 * 5/2014 Templin .................... B08B 5/04 134/166 R
2003/0132193 A1 7/2003 Okamoto
2004/0139985 A1 * 7/2004 Hegedus ........... H01L 21/67075 134/148
2011/0056913 A1 3/2011 Mayer et al.
2021/0101167 A1 * 4/2021 Hill ....................... B05B 7/2494

FOREIGN PATENT DOCUMENTS

| | | | | |
|---|---|---|---|---|
| CN | 209772506 U | 12/2019 | | |
| GB | 2316366 A | 2/1998 | | |
| JP | S57110356 A | 7/1982 | | |
| JP | 2004273984 A | 9/2004 | | |
| WO | 9427736 A1 | 12/1994 | | |
| WO | 2013048834 A1 | 4/2013 | | |
| WO | WO-2021194479 A1 | * | 9/2021 | ........... B29C 71/009 |

OTHER PUBLICATIONS

European search report dated May 22, 2024 issued in EP Patent Application No. 23211882.8.
Great Britain search report issued in GB Patent Application No. 2219339.5 dated Jun. 21, 2023.

* cited by examiner

*Primary Examiner* — Cristi J Tate-Sims

(57) ABSTRACT

A system for wet treatment of at least one component has a chamber configured to receive and at least partially enclose the at least one component. The system also has at least one component support, a plurality of tanks configured to store a corresponding plurality of fluids, at least one nozzle selectively fluidly coupled to the plurality of tanks and configured to spray a fluid towards the at least one component, at least one delivery valve for selectively fluidly coupling the at least one nozzle to the plurality of tanks, at least one port configured to collect the fluid sprayed by the at least one nozzle, and at least one recovery valve for selectively fluidly coupling the at least one port to the plurality of tanks.

18 Claims, 6 Drawing Sheets

SYSTEM AND METHOD FOR WET TREATMENT OF COMPONENT

CROSS-REFERENCE TO RELATED APPLICATIONS

This specification is based upon and claims the benefit of priority from United Kingdom patent application number GB 2219339.5 filed on Dec. 21, 2022, the entire contents of which are incorporated herein by reference.

BACKGROUND

Technical Field

The present disclosure relates generally to a wet treatment of a component. More particularly, the present disclosure relates to a system and a method for the wet treatment of the component.

Description of the Related Art

Wet treatment process is a commonly used process for treatment of one or more surfaces of a component. In general, the wet treatment process includes a pre-treatment process, a chemical etching process, and a post-treatment process. In the pre-treatment process, a surface layer to be etched may be washed using a suitable scale conditioning fluid, following which the chemical etching process may be performed. During the chemical etching process, the surface layer may be removed from the component by means of an acid, base, or any other chemical fluid applied to the component for a period of time. The acid, base, or the other chemical fluid may dissolve the surface layer of the component. In the post-treatment process, a further wash of the surface layer may be required after the chemical etching process, such that the surface layer is free of acid, base, or the other chemical fluid.

Conventionally, the wet treatment process is accomplished using large processing tanks, or etch tanks, within which an entire component is submerged for a predetermined period of time, until a required surface thickness has been removed from the component. The large processing tanks may be difficult to maintain due to a large volume of fluid contained in them. Further, heating of the fluids in the large processing tanks may incur a huge operational cost and time. Generally, such large processing tanks are maintained at a predefined temperature all year round, which may also increase operational cost of the wet treatment process. Further, using the large processing tanks for the wet treatment process may also lead to wastage of the fluid during the wet treatment process and may lack in process accuracy and effectiveness. Furthermore, the large processing tanks are typically open and therefore, may pose risk relating to the health, safety, and the environment.

SUMMARY

According to a first aspect, there is provided a system for wet treatment of at least one component. The system includes a chamber including a base and a plurality of sidewalls extending from the base. The chamber is configured to receive and at least partially enclose the at least one component. The system further includes at least one component support configured to support the at least one component within the chamber. The system further includes a plurality of tanks configured to store a corresponding plurality of fluids. The system further includes at least one nozzle selectively fluidly coupled to the plurality of tanks. The at least one nozzle is at least partially disposed within the chamber. The at least one nozzle is configured to spray a fluid towards the at least one component. The system further includes at least one delivery valve disposed upstream of the at least one nozzle for selectively fluidly coupling the at least one nozzle to the plurality of tanks. The system further includes at least one port disposed in the base of the chamber. The at least one port is configured to collect the fluid sprayed by the at least one nozzle. The system further includes at least one recovery valve disposed downstream of the at least one port for selectively fluidly coupling the at least one port to the plurality of tanks. The system further includes a controller communicably coupled to each of the at least one nozzle, the at least one delivery valve, and the at least one recovery valve.

The system of the present disclosure including the controller may therefore provide the wet treatment or the surface treatment of at least one component in an automatic manner and may not require any operator. In some cases, the operator may only be required for loading or unloading of the at least one component inside the chamber. Therefore, the system may reduce health, safety, and the environment (HSE) risks. Further, the system may reduce use of conventional large processing tanks thereby saving a lot of space in a manufacturing or processing facility. The system may also have a lower maintenance cost than that of the conventional large processing tanks.

Further, in some cases, the chamber may fully enclose the at least one component. The system may therefore prevent spillage of the plurality of fluids and may also prevent evaporation of the plurality of fluids in addition to reducing the HSE risks. Therefore, in some cases, the system may also reduce wastage of the plurality of fluids.

Moreover, the at least one nozzle may provide active agitation and impingement of the corresponding fluid on the at least one component which may improve the wet treatment of the at least one component. The at least one nozzle may include a spray nozzle including, but not limited to, a full cone spray nozzle, a hollow cone spray nozzle, flat fan spray nozzle, solid stream spray nozzle, or the like.

Furthermore, the at least one recovery valve and the at least one port may allow the system to recover and recycle the plurality of fluids. This may further reduce wastage of the plurality of fluids. Therefore, smaller tanks may be used in contrast to the conventional large processing tanks.

In some embodiments, the controller is configured to select which of the plurality of tanks to selectively couple with the at least one nozzle based on a predetermined sequence. The controller is further configured to control the at least one delivery valve, such that the selected tank is fluidly coupled with the at least one nozzle. The controller is further configured to control the at least one nozzle, such that the at least one nozzle sprays the corresponding fluid stored in the selected tank towards the at least one component. The controller is further configured to control the at least one recovery valve, such that the at least one recovery valve allows a flow of the corresponding fluid collected at the at least one port to the selected tank.

In some embodiments, each of the at least one delivery valve and the at least one recovery valve may include control valves, shut-off valves, multiport valves, or the like.

The at least one nozzle spraying the fluid towards the at least one component may deliver a similar, or a better result, whilst processing a lesser amount of the corresponding fluid as compared to conventional process of dipping the at least one component in the conventional large processing tanks for the wet treatment of the at least one component. Further, the at least one nozzle may be controlled to apply the plurality of fluids at different pressures, such that the system may achieve a desired fluid film thickness on the at least one component. Further, the controller may control the at least one nozzle to spray mists of fluid towards the at least one component for uniform treatment and to further reduce usage of the corresponding fluid.

In some embodiments, the system further includes a plurality of delivery conduits corresponding to the plurality of tanks. Each of the plurality of delivery conduits fluidly couples the corresponding tank to the at least one delivery valve. The system further includes a plurality of recovery conduits corresponding to the plurality of tanks. Each of the plurality of recovery conduits fluidly couples the at least one recovery valve to the corresponding tank.

The plurality of delivery conduits corresponding to the plurality of tanks provides a medium to a flow of the corresponding plurality of fluids stored in the plurality of tanks to the at least one nozzle. The plurality of delivery conduits may allow the corresponding plurality of fluids to flow from the plurality of tanks towards the at least one nozzle without spillage of the corresponding plurality of fluids contained in the plurality of tanks. Further, the plurality of delivery conduits may prevent cross contamination and intermixing of the corresponding plurality of fluids.

In some embodiments, the at least one delivery valve includes a single delivery valve configured to selectively fluidly couple the plurality of delivery conduits to the at least one nozzle. Further, in some embodiments, the at least one recovery valve includes a single recovery valve configured to selectively fluidly couple the plurality of recovery conduits to the at least one port. The single delivery valve and the single recovery valve may reduce a number of components of the system.

In some embodiments, the at least one delivery valve includes a plurality of delivery valves corresponding to the plurality of delivery conduits. Each delivery valve from the plurality of delivery valves is configured to selectively fluidly couple the corresponding delivery conduit to the at least one nozzle. Further, in some embodiments, the at least one recovery valve includes a plurality of recovery valves corresponding to the plurality of recovery conduits. Each recovery valve from the plurality of recovery valves is configured to selectively fluidly couple the corresponding recovery conduit to the at least one port.

The plurality of delivery valves corresponding to the plurality of delivery conduits may ensure that only the corresponding fluid of the selected tank is sprayed towards the at least one component by the at least one nozzle. In other words, the plurality of delivery valve corresponding to the plurality of delivery conduits may help in efficient wet treatment of the at least one component by selectively controlling the flow the corresponding fluid stored in the selected tank towards the at least one component by the at least one nozzle. Further, the plurality of recovery valves corresponding to the plurality of recovery conduits may ensure proper recovery of the sprayed fluid drained inside the chamber towards the selected tank. Further, the plurality of delivery valve and the plurality of recovery valves may prevent cross contamination and intermixing of the plurality of fluids.

In some embodiments, the controller is communicably coupled to the at least one component support. The controller is further configured to control the at least one component support to move the at least one component within the chamber while the at least one nozzle sprays the corresponding fluid stored in the selected tank towards the at least one component. In some examples, the at least one component support may include at least one of a jig, a rotatable component, or the like configured to move the at least one component in a linear, a rotary, or an oscillatory motion.

The at least one component support may rotate, manipulate, or orientate the at least one component inside the chamber while the at least one nozzle sprays the corresponding fluid towards the at least one component such that the at least one nozzle may evenly spray the corresponding fluid towards the at least one component. In other words, the at least one component support may move the at least one component within the chamber such that all surface areas of the at least one component may be evenly treated.

In some embodiments, the base is inclined towards the at least one port. The inclination of the base towards the at least one port may allow the corresponding fluid to be collected at the at least one port and recovered back into the selected tank. A suction means may be used for collecting the fluid at the at least one port from the rest of the base of the chamber.

In some embodiments, the controller is further configured to control one or more parameters of the at least one nozzle. The one or more parameters include at least one of a fluid flow rate of the at least one nozzle, a fluid pressure of the at least one nozzle, an opening period of the at least one nozzle, and a droplet size of the at least one nozzle. Controlling the one or more parameters may control an amount of the corresponding fluid sprayed from the at least one nozzle. In some examples, the one or more parameters may be controlled based on requirements of the wet treatment. The amount of the corresponding fluid sprayed may be optimized to efficiently treat the at least one component while achieving a desired thickness of the corresponding fluid over the at least one component.

In some embodiments, the at least one nozzle includes a plurality of nozzles. The plurality of nozzles follows a profile of the at least one component. The plurality of nozzles following the profile of the at least one component may spray the corresponding fluid uniformly and optimally towards the at least one component. Further, the plurality of nozzle may uniformly treat the at least one component. The at least one nozzle may spray the fluid in a continuous laminar flow towards the at least one component. The continuous laminar flow of the fluid over the at least one component may ensure that an inactive layer of spent fluid does not build up on the at least one component. In some cases, the plurality of nozzles may include similar type of nozzles. However, in some other cases, the plurality of nozzles may include different types of nozzles, as per desired application attributes.

In some embodiments, the system further includes a heating device disposed upstream of the at least one nozzle. The heating device is configured to heat and store the corresponding fluid before the at least one nozzle sprays the corresponding fluid stored in the selected tank towards the at least one component. The heating device may heat the corresponding fluid in case the corresponding fluid may be required to be heated for the wet treatment. In contrast to heating the corresponding fluid stored in the conventional large processing tank, the heating device may only heat a lesser amount of the corresponding fluid and for a shorter interval of time, thus, saving operational cost of the system. This may further reduce consumption of heating energy thereby reducing the operating cost of the system.

In some embodiments, the system further includes at least one syphon conduit configured to remove the corresponding fluid sprayed by the at least one nozzle from the at least one component. The at least one syphon conduit is further configured to transport the corresponding fluid removed from the at least one component to the at least one port. Therefore, the at least one syphon conduit may automatically remove and transport the corresponding fluid sprayed by the at least one nozzle from the at least one component to the at least one port.

According to a second aspect, there is provided a method for wet treatment of at least one component. The method includes providing a chamber including a base and a plurality of sidewalls extending from the base. The chamber is configured to receive and at least partially enclose the at least one component. The method further includes providing at least one component support configured to support the at least one component within the chamber. The method further includes providing a plurality of tanks configured to store a corresponding plurality of fluids. The method further includes providing at least one nozzle selectively fluidly coupled to the plurality of tanks. The at least one nozzle is at least partially disposed within the chamber. The at least one nozzle is configured to spray a fluid towards the at least one component. The method further includes providing at least one delivery valve disposed upstream of the at least one nozzle for selectively fluidly coupling the at least one nozzle to the plurality of tanks. The method further includes providing at least one port disposed in the base of the chamber. The at least one port is configured to collect the fluid sprayed by the at least one nozzle. The method further includes providing at least one recovery valve disposed downstream of the at least one port for selectively fluidly coupling the at least one port to the plurality of tanks.

In some embodiments, the method further includes selecting which of the plurality of tanks to selectively couple with the at least one nozzle based on a predetermined sequence. The method further includes controlling the at least one delivery valve, such that the selected tank is fluidly coupled with the at least one nozzle. The method further includes controlling the at least one nozzle, such that the at least one nozzle sprays the corresponding fluid stored in the selected tank towards the at least one component. The method further includes controlling the at least one recovery valve, such that the at least one recovery valve allows a flow of the corresponding fluid collected at the at least one port to the selected tank.

In some embodiments, the method further includes providing a plurality of delivery conduits corresponding to the plurality of tanks. Each of the plurality of delivery conduits fluidly couples the corresponding tank to the at least one delivery valve. The method further includes providing a plurality of recovery conduits corresponding to the plurality of tanks. Each of the plurality of recovery conduits fluidly couples the at least one recovery valve to the corresponding tank.

In some embodiments, the at least one delivery valve includes a single delivery valve. In some embodiments, controlling the at least one delivery valve further includes controlling the single delivery valve to selectively fluidly couple each of the plurality of delivery conduits to the at least one nozzle. In some embodiments, the at least one recovery valve includes a single recovery valve. In some embodiments, controlling the at least one recovery valve further includes controlling the single recovery valve to selectively fluidly couple each of the plurality of recovery conduits to the at least one port.

In some embodiments, the at least one delivery valve includes a plurality of delivery valves corresponding to the plurality of delivery conduits. In some embodiments, controlling the at least one delivery valve further includes controlling each delivery valve from the plurality of delivery valves to selectively fluidly couple the corresponding delivery conduit to the at least one nozzle. In some embodiments, the at least one recovery valve includes a plurality of recovery valves corresponding to the plurality of recovery conduits. In some embodiments, controlling the at least one recovery valve further includes controlling each recovery valve from the plurality of recovery valves to selectively fluidly couple the corresponding recovery conduit to the at least one port.

In some embodiments, the method further includes controlling the at least one component support to move the at least one component within the chamber while the at least one nozzle sprays the corresponding fluid stored in the selected tank towards the at least one component.

In some embodiments, the method further includes controlling one or more parameters of the at least one nozzle. The one or more parameters include at least one of a fluid flow rate of the at least one nozzle, a fluid pressure of the at least one nozzle, an opening period of the at least one nozzle, and a droplet size of the at least one nozzle.

In some embodiments, the method further includes heating and storing the corresponding fluid before the at least one nozzle sprays the corresponding fluid stored in the selected tank towards the at least one component.

In some embodiments, the method further includes removing the corresponding fluid sprayed by the at least one nozzle from the at least one component. The method further includes transporting the corresponding fluid removed from the at least one component to the at least one port.

In some embodiments, the chamber may be heated, or heated jets or warmed air may be directed at the parts to aid drying prior to being unloaded from the chamber. In some embodiments, compressed air may be applied to aid drying of the parts or to accelerate the draining of the fluid from the parts or chamber.

DESCRIPTION OF THE DRAWINGS

Embodiments will now be described by way of example only, with reference to the figures, in which.

DETAILED DESCRIPTION

Aspects and embodiments of the present disclosure will now be discussed with reference to the accompanying figures. Further aspects and embodiments will be apparent to those skilled in the art.

Figure 1:
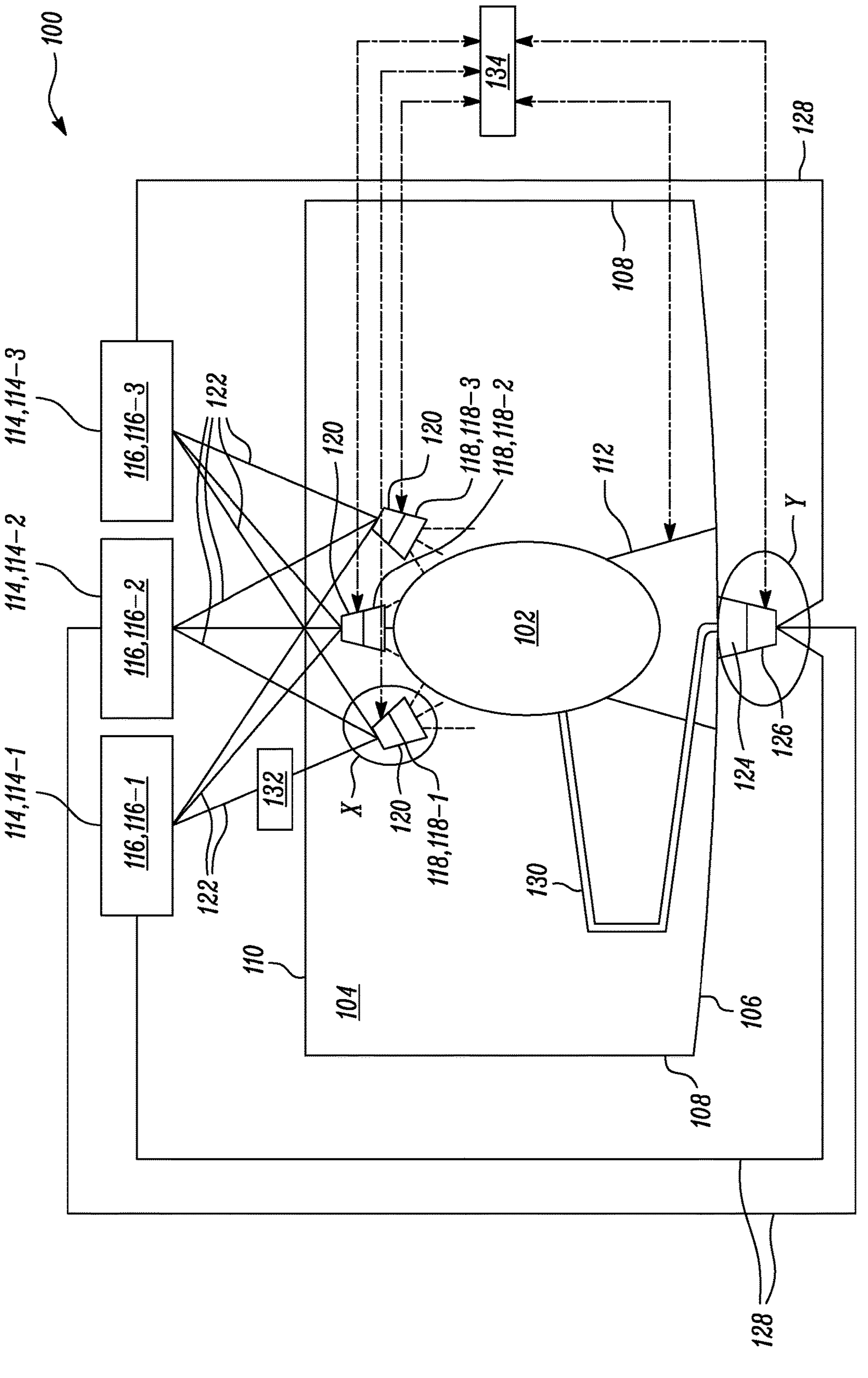
FIG. 1 is a schematic front view of a system for wet treatment of at least one component, according to an embodiment of the present disclosure.

FIG. 1 illustrates a schematic front view of a system 100 for wet treatment of at least one component 102, according to an embodiment of the present disclosure. In the illustrated embodiment of FIG. 1, the at least one component 102 is a single component. However, in some other embodiments, the at least one component 102 may include a plurality of components. In some embodiments, the at least one component 102 may be an aerospace component. In some embodiments, the at least one component 102 is a part of a gas turbine engine (not shown). In some embodiments, the at least one component 102 of the gas turbine engine is a bladed disk drum or a fan blade. It should however be noted that the system of the present disclosure can be used for the manufacture of parts other than aerospace parts.

The system 100 includes a chamber 104. Specifically, the system 100 includes a housing 110 defining the chamber 104. The chamber 104 includes a base 106 and a plurality of sidewalls 108 extending from the base 106. The chamber 104 is configured to receive and at least partially enclose the at least one component 102. In other words, the housing 110 of the chamber 104 receives and at least partially encloses the at least one component 102.

The system is manufactured using materials suitable for the manufacture of wet processing systems, and for the chemistry being applied. In some examples, the chamber 104 may be made of a metallic material, a polymeric material, a ceramic material, or a combination thereof. In some other examples, the chamber 104 may be made of, but not limited to, stainless steel, quartz, or alumina. In some other examples, the system 100 may include several chambers (e.g., the chamber 104), for enabling different wet treatment processes on the at least one component 102. Further, the chambers may be manufactured of different materials that may allow different types of wet treatment processes.

The system 100 further includes at least one component support 112 configured to support the at least one component 102 within the chamber 104. In the illustrated embodiment of FIG. 1, the system 100 includes one component support 112 configured to support the component 102. However, any number or type of the at least one component support 112 may be used to support the corresponding component 102 based on desired application attributes. For example, the at least one component support 112 may include at least one of a jig, a rotatable component, a support fixture, a hanging support, or the like.

The system 100 further includes a plurality of tanks 114 configured to store a corresponding plurality of fluids 116. In some cases, the plurality of fluids 116 may be collectively or individually referred to hereinafter as "the fluid 116". In the illustrated embodiment of FIG. 1, the plurality of tanks 114 includes three tanks. Specifically, the plurality of tanks 114 includes a first tank 114-1, a second tank 114-2, and a third tank 114-3. However, the plurality of tanks 114 may include any number of tanks based on desired application attributes. Further, the corresponding plurality of fluids 116 includes three fluids. Specifically, the corresponding plurality of fluids 116 includes a first fluid 116-1, a second fluid 116-2, and a third fluid 116-3. Particularly, the first tank 114-1 may be configured to store the first fluid 116-1. The second tank 114-2 may be configured to store the second fluid 116-2. The third tank 114-3 may be configured to store the third fluid 116-3. Further, in some embodiments, each of the first, second, and third tanks 114-1, 114-2, 114-3 from the plurality of tanks 114 may be identical or similar in shape and size. However, in some other embodiments, each of the first, second, and third tanks 114-1, 114-2, 114-3 from the plurality of tanks 114 may be different in shape and size, as per desired application attributes.

In some examples, the plurality of fluids 116 may include acid or alkali solutions. For example, the plurality of fluids 116 may include hydrofluorosilicic ($H_2SiF_6$) acid, nitric ($HNO_3$) acid, hydrofluoric (HF) acid, water, a detergent solution, a scale conditioner, etchant fluid pastes, or a combination of the above. In some embodiments, the plurality of fluids 116 may be used for the surface treatment of the at least one component 102. In some embodiments, the plurality of fluids 116 may be used for rinsing, cleaning, and neutralising the at least one component 102. In some embodiments, the system may be used to prepare parts and apply fluids for non-destructive fluorescent penetrant inspection.

The system 100 further includes at least one nozzle 118 selectively fluidly coupled to the plurality of tanks 114. The at least one nozzle 118 is at least partially disposed within the chamber 104. The at least one nozzle 118 is configured to spray the fluid 116 towards the at least one component 102. In some embodiments, the at least one nozzle 118 may include a spray nozzle including, but not limited to, a full cone spray nozzle, a hollow cone spray nozzle, flat fan spray nozzle, solid stream spray nozzle, or the like.

In some embodiments, the at least one nozzle 118 includes a plurality of nozzles 118. In some embodiments, the plurality of nozzles 118 follows a profile of the at least one component 102. In some examples, the plurality of nozzles 118 may follow the profile of the at least one component 102 such that the plurality of nozzles 118 may spray the fluid 116 uniformly and optimally towards the at least one component 102.

In the illustrated embodiment of FIG. 1, the at least one nozzle 118 includes three nozzles 118. Specifically, the at least one nozzle 118 includes a first nozzle 118-1, a second nozzle 118-2, and a third nozzle 118-3. However, it should be noted that the system 100 may include any number of nozzles 118 based on desired application attributes. For example, the at least one nozzle 118 may include a number of nozzles that may be required to follow the profile of the at least one component 102 and spray the fluid 116 uniformly towards the at least one component 102.

The plurality of nozzles 118 following the profile of the at least one component 102 may ensure that the wet treatment is uniform at all surface areas of the at least one component 102. Thus, the plurality of nozzles 118 may properly treat the at least one component 102. The at least one nozzle 118 may spray the fluid 116 in a continuous laminar flow towards the at least one component. The continuous laminar flow of the fluid 116 towards the at least one component 102 may ensure that an inactive layer of the fluid 116 does not build up on the at least one component 102.

As discussed above, the at least one nozzle 118 is configured to spray the fluid 116 towards the at least one component 102. Specifically, each of the first nozzle 118-1, the second nozzle 118-2, and the third nozzle 118-3 is configured to spray the first fluid 116-1, the second fluid

116-2, and third fluid 116-3 stored in the first tank 114-1, the second tank 114-2, and the third tank 114-3, respectively, towards the at least one component 102. In some examples, the at least one component 102 may be electrostatically or electrically charged to improve the wet treatment of the at least one component 102. Specifically, the fluid 116 being sprayed and the at least one component 102 may be electrostatically or electrically charged with opposite charges to improve the wet treatment of the at least one component 102.

The system 100 further includes at least one delivery valve 120 disposed upstream of the at least one nozzle 118 for selectively fluidly coupling the at least one nozzle 118 to the plurality of tanks 114. In some embodiments, the at least one delivery valve 120 may include control valves, shut-off valves, multiport valves, or the like.

In the illustrated embodiment of FIG. 1, the at least one delivery valve 120 includes three delivery valves 120. Further, the three delivery valves 120 are disposed upstream of the first nozzle 118-1, the second nozzle 118-2, and the third nozzle 118-3, respectively. Each delivery valve 120 selectively couples the at least one nozzle 118 to one of the plurality of tanks 114. For example, the delivery valve 120 disposed upstream of the first nozzle 118-1 may selectively couple the first nozzle 118-1 to one of the first tank 114-1, the second tank 114-2, and the third tank 114-3.

In some embodiments, the system 100 further includes a plurality of delivery conduits 122 corresponding to the plurality of tanks 114. In the illustrated embodiment of FIG. 1, the plurality of delivery conduits includes nine delivery conduits 122. Each of the plurality of delivery conduits 122 fluidly couples the corresponding tank 114 to the at least one delivery valve 120. In the illustrated embodiment of FIG. 1, the plurality of conduits 122 fluidly couples the first tank 114-1, the second tank 114-2, and the third tank 114-3 to each of the plurality of delivery valves 120 disposed upstream of the first nozzle 118-1, the second nozzle 118-2, and the third nozzle 118-3. It should be noted that a number of delivery conduits 122 may vary based on the number of tanks 114 and/or the number of delivery valves 120.

In some examples, the plurality of delivery conduits 122 corresponding to the plurality of tanks 114 provides a medium to a flow of the corresponding plurality of fluids 116 stored in the plurality of tanks 114 to the at least one nozzle 118. The plurality of delivery conduits 122 may allow the fluid 116 to flow from the selected tank 114 towards the at least one nozzle 118 without spillage of the corresponding plurality of fluids 116 contained in the plurality of tanks 114. Further, the plurality of delivery conduits 122 may prevent cross contamination and intermixing of the corresponding plurality of fluids 116.

Figure 2B:
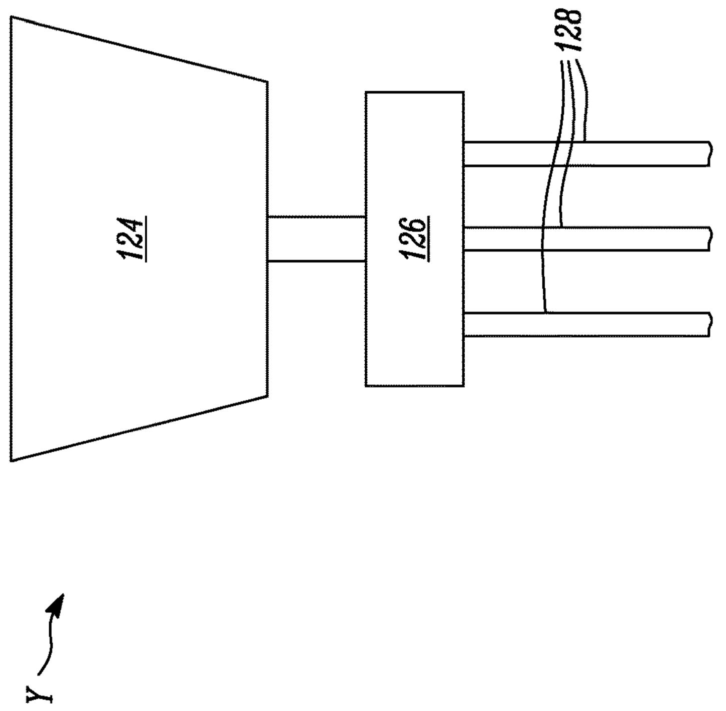
FIG. 2B is an enlarged schematic view of a section Y of the system of FIG. 1, according to an embodiment of the present disclosure.
Figure 2A:
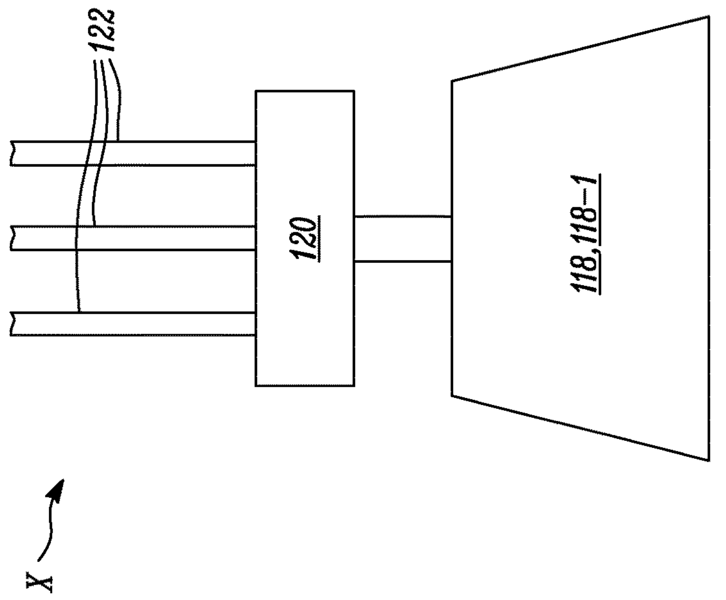
FIG. 2A is an enlarged schematic view of a section X of the system of FIG. 1, according to an embodiment of the present disclosure.

FIG. 2A is an enlarged schematic view of a section X (shown in FIG. 1) of the system 100 shown in FIG. 1, according to an embodiment of the present disclosure. The at least one delivery valve 120 is configured to selectively fluidly couple the plurality of delivery conduits 122 to the at least one nozzle 118. Specifically, as illustrated in FIG. 2A, the delivery valve 120 disposed upstream of the first nozzle 118-1 is configured to fluidly couple one of the plurality of conduits 122 to the first nozzle 118-1 to spray one of the corresponding plurality of fluids 116 towards the at least one component 102. Similarly, the delivery valve 120 disposed upstream of the second nozzle 118-2 (shown in FIG. 1) is configured to fluidly couple one of the plurality of conduits 122 to the second nozzle 118-2 to spray the same one of the corresponding plurality of fluids 116 towards the at least one component 102, and the delivery valve 120 disposed upstream of the third nozzle 118-3 (shown in FIG. 1) is configured to fluidly couple one of the plurality of conduits 122 to the third nozzle 118-3 to spray the same one of the corresponding plurality of fluids 116 towards the at least one component 102.

Referring again to FIG. 1, the system 100 further includes at least one port 124 disposed in the base 106 of the chamber 104. The at least one port 124 is configured to collect the fluid 116 sprayed by the at least one nozzle 118. In some embodiments, the base 106 is inclined towards the at least one port 124. The inclination of the base 106 towards the at least one port 124 may allow the fluid 116 sprayed by the at least one nozzle 118 to flow towards the at least one port 124 and collect at the at least one port 124. Particularly, in the illustrated embodiment of FIG. 1, the system 100 includes a single port 124 which is configured to collect the first fluid 116-1, the second fluid 116-2, or the third fluid 116-3 after being sprayed by the first nozzle 118-1, the second nozzle 118-2, and the third nozzle 118-3. A suction means may be used for collecting the fluid 116 at the at least one port 124 from the rest of the base 106 of the chamber 104.

The system 100 further includes at least one recovery valve 126 disposed downstream of the at least one port 124 for selectively fluidly coupling the at least one port 124 to the plurality of tanks 114. In some embodiments, the at least one recovery valve 126 may include control valves, shut-off valves, multiport valves, or the like.

In the illustrated embodiment of FIG. 1, the at least one recovery valve 126 includes a single recovery valve 126 to selectively fluidly couple the at least one port 124 to one of the plurality of tanks 114. Specifically, the single recovery valve 126 selectively fluidly couples the at least one port 124 to one of the first tank 114-1, the second tank 114-2, and the third tank 114-3.

In some embodiments, the system 100 further includes a plurality of recovery conduits 128 corresponding to the plurality of tanks 114. Each of the plurality of recovery conduits 128 fluidly couples the at least one recovery valve 126 to the corresponding tank 114. In the illustrated embodiment of FIG. 1, the plurality of recovery conduits 128 includes three recovery conduits 128 that fluidly couple the recovery valve 126 to the first tank 114-1, the second tank 114-2 and the third tank 114-3, respectively. A number of recovery conduits 128 may vary based on the number of tanks 114 and/or the number of recovery valve 126. In some examples, the plurality of recovery conduits 128 may allow recovery of the fluid 116 collected at the at the at least one port 124 to the corresponding tank 114.

FIG. 2B is an enlarged schematic view of a section Y (shown in FIG. 1) of the system 100 shown in FIG. 1, according to an embodiment of the present disclosure. The at least one recovery valve 126 is configured to selectively fluidly couple the plurality of recovery conduits 128 to the at least one port 124.

Referring again to FIG. 1, the system 100 further includes a controller 134 communicably coupled to each of the at least one nozzle 118, the at least one delivery valve 120, and the at least one recovery valve 126. Specifically, in the illustrated embodiment of FIG. 1, the controller 134 is communicably coupled to each of the first nozzle 118-1, the second nozzle 118-2, the third nozzle 118-3, the three delivery valves 120, and the at least one recovery valve 126.

The controller 134 may include one or more processors and one or more memories. It should be noted that the one or more processors may embody a single microprocessor or multiple microprocessors for receiving various input signals. Numerous commercially available microprocessors may be configured to perform the functions of the one or more processors. Each processor may further include a general processor, a central processing unit, an application specific integrated circuit (ASIC), a digital signal processor, a field programmable gate array (FPGA), a digital circuit, an analog circuit, a controller, a microcontroller, any other type of processor, or any combination thereof. Each processor may include one or more components that may be operable to execute computer executable instructions or computer code that may be stored and retrieved from the one or more memories.

In some embodiments, the controller 134 may be used to monitor health parameters of the corresponding plurality of fluids 116 inside the plurality of tanks 114. In some embodiments, the health parameters may be monitored by measuring titration, conductivity, concentration, and cleanliness of the corresponding plurality of fluids 116 inside the plurality of tanks 114. In some examples, the controller 134 may generate an alert or an alarm when one or more of the health parameters cross corresponding threshold levels and can affect the wet treatment process of the at least one component 102.

In some embodiments, the controller 134 is configured to select which of the plurality of tanks 114 to selectively couple with the at least one nozzle 118 based on a predetermined sequence. Particularly, the controller 134 is configured to select which of the plurality of tanks 114, i.e., the first tank 114-1, the second tank 114-2, or the third tank 114-3 to selectively couple with the first nozzle 118-1, the second nozzle 118-2, and the third nozzle 118-3 based on the predetermined sequence. The predetermined sequence may be based on the requirements for a particular wet treatment of the at least one component 102. For example, the controller may select the first tank 114-1 to selectively couple with the first nozzle 118-1, the second nozzle 118-2, and the third nozzle 118-3 based on the predetermined sequence.

In some embodiments, the controller 134 is further configured to control the at least one delivery valve 120, such that the selected tank 114 is fluidly coupled with the at least one nozzle 118. In other words, the controller 134 is configured to control each delivery valve 120 such that the selected tank 114, i.e., any one of the first tank 114-1, the second tank 114-2, and the third tank 114-3 is fluidly coupled with the first nozzle 118-1, the second nozzle 118-2, and the third nozzle 118-3. For example, the controller 134 may control the at least one delivery valve 120, such that the selected tank 114 (e.g., the first tank 114-1) is fluidly coupled with the first nozzle, the second nozzle, and the third nozzle.

In some embodiments, the controller 134 is further configured to control the at least one nozzle 118, such that the at least one nozzle 118 sprays the corresponding fluid 116 stored in the selected tank 114 towards the at least one component 102. For example, the controller 134 may control the first nozzle 118-1, the second nozzle 118-2, and the third nozzle 118-3, such that the first nozzle 118-1, the second nozzle 118-2, and the third nozzle 118-3 spray the first fluid 116-1 stored in the first tank 114-1 towards the at least one component 102.

In some embodiments, the controller 134 is further configured to control one or more parameters of the at least one nozzle 118. The one or more parameters include at least one of a fluid flow rate of the at least one nozzle 118, a fluid pressure of the at least one nozzle 118, an opening period of the at least one nozzle 118, and a droplet size of the at least one nozzle 118. In the illustrated embodiment of FIG. 1, the controller 134 is configured to control one or more parameters of the first nozzle 118-1, the second nozzle 118-2 and the third nozzle 118-3. In some examples, controlling the one or more parameters may control an amount of the corresponding fluid 116 sprayed from the at least one nozzle 118. In some examples, the one or more parameters may be controlled based on requirements of the wet treatment. The amount of the corresponding fluid 116 sprayed may be optimized to treat the at least one component 102 while achieving a desired thickness of the corresponding fluid 116 over the at least one component 102.

The at least one nozzle 118 spraying the corresponding fluid 116 towards the at least one component 102 may deliver a similar, or a better result, whilst using a lesser amount of the corresponding fluid 116 as compared to conventional process of dipping the at least one component 102 in large processing tanks for the wet treatment of the at least one component 102. Further, the at least one nozzle 118 may be controlled to apply the plurality of fluids 116 at different pressures, such that the system 100 may achieve a desired fluid film thickness on the at least one component 102. Further, the controller 134 may control the at least one nozzle 118 to spray mists of the corresponding fluid 116 towards the at least one component 102 for uniform treatment and to further reduce usage of the corresponding fluid.

In some embodiments, the controller 134 is communicably coupled to the at least one component support 112. The controller 134 is further configured to control the at least one component support 112 to move the at least one component 102 within the chamber 104 while the at least one nozzle 118 sprays the corresponding fluid 116 stored in the selected tank 114 towards the at least one component 102. In other words, the controller 134 is configured to control the at least one component support 112 to move the at least one component 102 within the chamber 104 while the first nozzle 118-1, the second nozzle 118-2, and the third nozzle 118-3 spray the corresponding fluid 116 i.e., the first fluid 116-1 stored in the first tank 114-1, the second fluid 116-2 stored in the second tank 114-2, or the third fluid 116-3 stored in the third tank 114-3. In some examples, the at least one component support 112 may be configured to move the at least one component 102 in a linear, a rotary, or an oscillatory motion.

In some examples, the at least one component support 112 may rotate, manipulate, or orientate the at least one component 102 inside the chamber 104 while the at least one nozzle 118 sprays the corresponding fluid 116 towards the at least one component 102 such that the at least one nozzle 118 may evenly spray the corresponding fluid 116 on all surfaces of the at least one component 102. In other words, the at least one component support 112 may move the at least one component 102 within the chamber 104 such that all surface areas of the at least one component 102 may be evenly treated.

In some embodiments, the controller 134 is further configured to control the at least one recovery valve 126, such that the at least one recovery valve 126 allows a flow of the corresponding fluid 116 collected at the at least one port 124 to the selected tank 114. In the illustrated embodiment of FIG. 1, the controller 134 is further configured to control the single recovery valve 126, such that the single recovery valve 126 allows the flow of the corresponding fluid 116 to the selected tank 114, i.e., the first fluid 116-1 to the first tank 114-1, the second fluid 116-2 to the second tank 114-2, and the third fluid 116-3 to the third tank 114-3. Therefore, the at least one recovery valve 126 may prevent cross contamination and intermixing of the plurality of fluids 116 before flowing to the respective tanks 114.

In some embodiments, the system 100 further includes a heating device 132 disposed upstream of the at least one nozzle 118. In the illustrated embodiment of FIG. 1, the heating device 132 is disposed upstream of the first nozzle 118-1. However, in some other embodiments, the heating device 132 may be disposed upstream of each of the first, second, and third nozzles 118-1, 118-2, 118-3. The heating device 132 is configured to heat and store the corresponding fluid 116, before the at least one nozzle 118 sprays the corresponding fluid 116 stored in the selected tank 114 towards the at least one component 102. For example, the heating device 132 may heat and store the first fluid 116-1 before the first nozzle 118-1 sprays the first fluid 116-1 stored in the first tank 114-1 towards the at least one component 102. In some examples, the heating device 132 may include an electric heater. In some other examples, the heating device 132 may include any other suitable heating means or energy source such as a heating rod or a heating coil to heat the corresponding fluid 116.

In some examples, the corresponding fluid 116 (e.g., one or more of the plurality of fluids 116) may be required to be heated for the wet treatment. The heating device 132 may heat the corresponding fluid 116 before the at least one nozzle 118 sprays the corresponding fluid 116. In contrast to heating the corresponding fluid stored in the conventional large processing tank, the heating device 132 may only heat a lesser amount of the corresponding fluid 116 and for a shorter interval of time, thus, saving operational cost of the system 100. This may further reduce consumption of energy thereby saving about 80% of energy consumption for operating the system 100.

In some embodiments, the system 100 further includes at least one syphon conduit 130 configured to remove the corresponding fluid 116 sprayed by the at least one nozzle 118 from the at least one component 102. For example, the at least one component 102 may have a complex shape/profile and the corresponding fluid 116 may get trapped in areas which may be difficult to drain. In such cases, the at least one syphon conduit 130 may remove the corresponding fluid 116 sprayed by the at least one nozzle 118 from such areas.

Therefore, the at least one syphon conduit 130 may automatically remove and transport the corresponding fluid 116 sprayed by the at least one nozzle 118 from the at least one component 102 to the at least one port 124. This may minimize human intervention. In some examples, the system 100 may reverse the at least one nozzle 118, such that the at least one nozzle 118 may act as a syphon to recover the corresponding fluid 116 that is trapped in such areas.

In some examples, after the wet treatment of the at least one component 102, the at least one component 102 may be transported from the chamber 104 through a transporter, or a carrier system (not shown). In some embodiments, the system 100 may be operated separately, or in conjunction with conventional wet process lines (e.g., including electrolytic or electroplating tanks) to complete all required wet treatment processes for the at least one component 102.

The system 100 may therefore provide the wet treatment of the at least one component 102 in an automatic manner and may not require any operator. In some cases, the operator may only be required for loading or unloading of the at least one component 102 inside the chamber 104. Therefore, the system 100 may reduce health, safety, and the environment (HSE) risks. Further, the system 100 may eliminate the use of the conventional large processing tanks thereby saving a lot of space in a manufacturing or processing facility. The system 100 may also have a lower maintenance cost than that of the conventional large processing tanks.

Further, in some cases, the chamber 104 may fully enclose the at least one component 102. The system 100 may therefore prevent spillage of the plurality of fluids 116 and may also prevent evaporation of the plurality of fluids 116 in addition to reducing the HSE risks. Therefore, in some cases, the system 100 may also reduce wastage of the plurality of fluids.

Moreover, the at least one nozzle 118 may provide active agitation and impingement of the corresponding fluid 116 on the at least one component 102 which may improve the wet treatment of the at least one component 102.

Furthermore, the at least one recovery valve 126 and the at least one port 124 may allow the system 100 to recover and recycle the plurality of fluids 116. This may further reduce wastage of the plurality of fluids 116. Therefore, smaller tanks may be used in contrast to the conventional large processing tanks.

Figure 3:
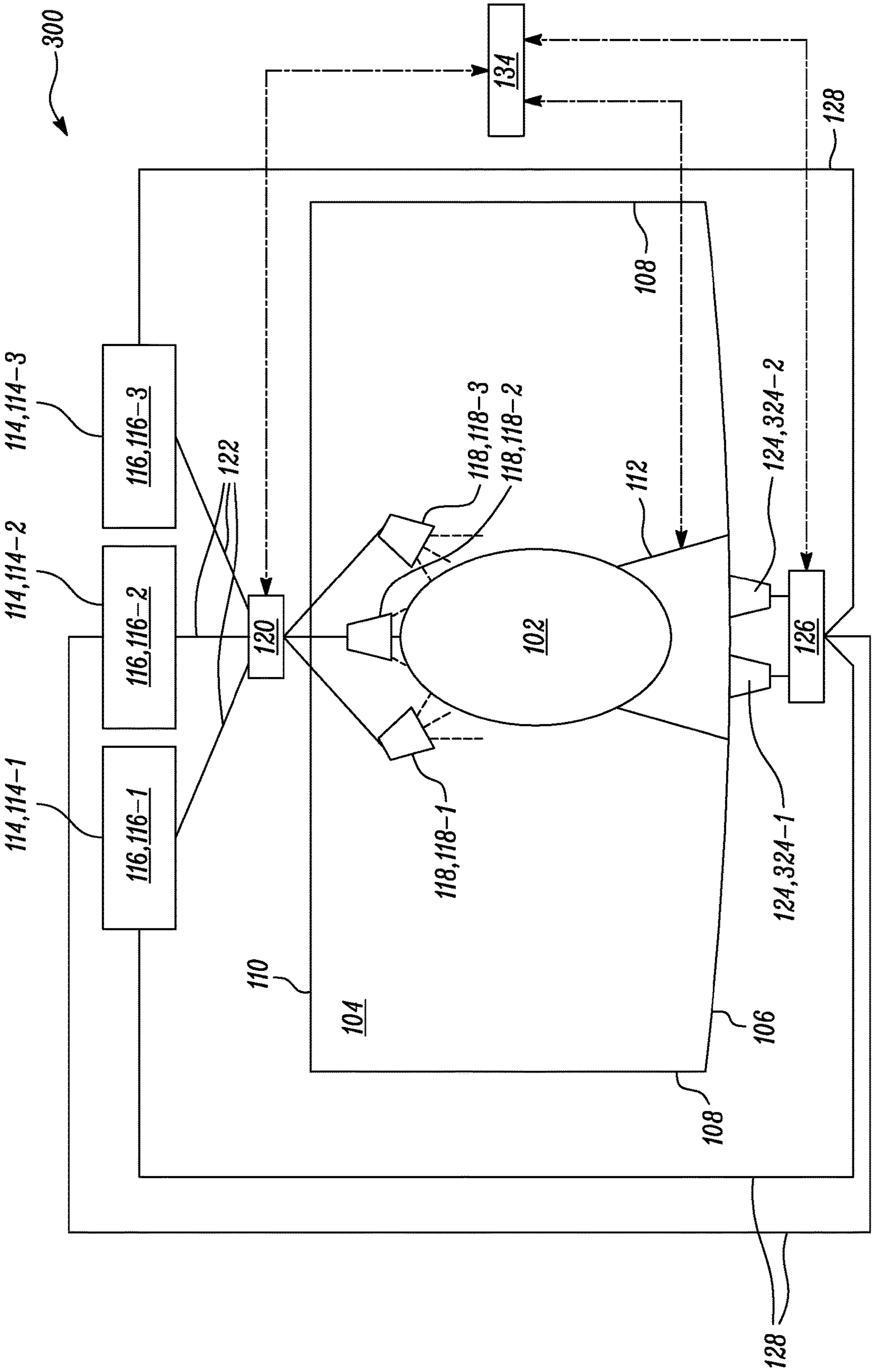
FIG. 3 is a schematic front view of a system for the wet treatment of the at least one component, according to another embodiment of the present disclosure.
Figure 4B:
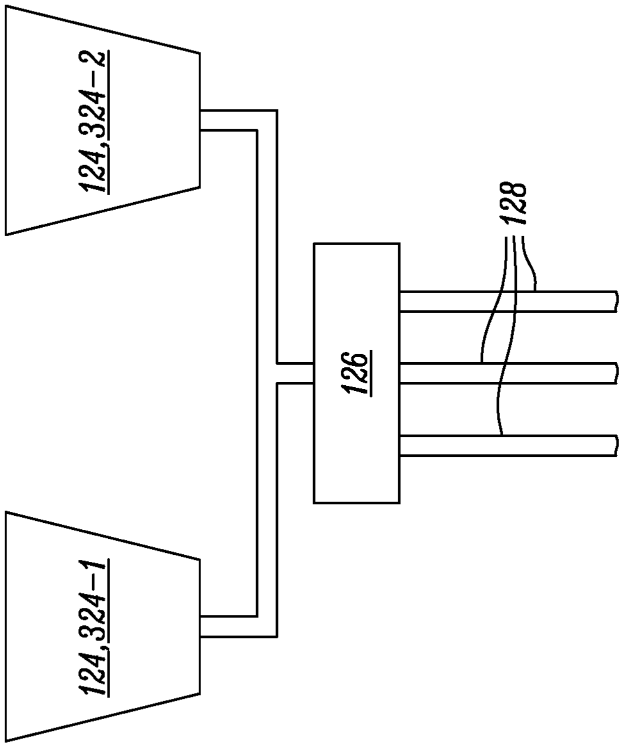
FIG. 4B is an enlarged schematic view of another portion of the system of FIG. 3, according to an embodiment of the present disclosure.
Figure 4A:
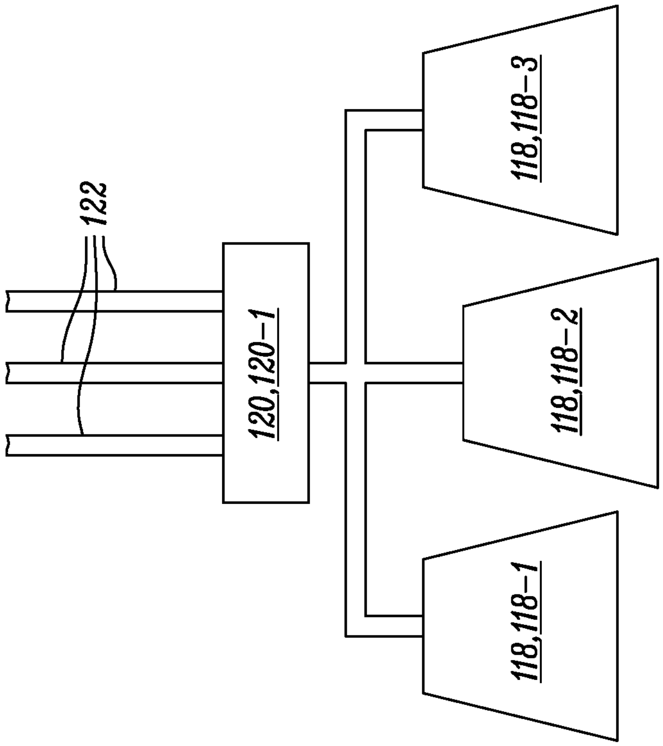
FIG. 4A is an enlarged schematic view of a portion of the system of FIG. 3, according to an embodiment of the present disclosure.

FIG. 3 illustrates a schematic front view of a system 300 for the wet treatment of the at least one component 102, according to another embodiment of the present disclosure. FIG. 4A illustrates an enlarged schematic view of a portion of the system 300, according to an embodiment of the present disclosure. FIG. 4B illustrates an enlarged schematic view of another portion of the system 300, according to an embodiment of the present disclosure.

The system 300 illustrated in FIG. 3 to FIG. 4B is substantially similar and functionally equivalent to the system 100 illustrated in FIG. 1, with common components being referred to by the same reference numerals. However, the at least one delivery valve 120 of the system 300 includes the single delivery valve 120 disposed upstream of the first nozzle 118-1, the second nozzle 118-2, and the third nozzle 118-3 (instead of the three delivery valves 120 disposed upstream of the first nozzle 118-1, the second nozzle 118-2, and the third nozzle 118-3, respectively, of the system 100 shown in FIG. 1). Further, the single delivery valve 120 is configured to selectively fluidly couple the plurality of delivery conduits 122 to the at least one nozzle 118. For example, in the illustrated embodiment of FIG. 3, the single delivery valve 120 is configured to selectively fluidly couple the plurality of delivery conduits 122 to the first nozzle 118-1, the second nozzle 118-2, and the third nozzle 118-3 (shown in FIG. 4A). The system 300 may include the syphon 130 which is not shown in FIG. 3 for the purpose of clarity.

Further, the at least one port of the system 300 includes two ports 324-1, 324-2 (instead of the single port 124 of the system 100 shown in FIG. 1) configured to collect the corresponding fluid 116 sprayed by the at least one nozzle 118.

Furthermore, the at least one recovery valve 126 of the system 300 includes the single recovery valve 126 configured to selectively fluidly couple the plurality of recovery conduits 128 to the at least one port 124 (e.g., the two ports 324-1, 324-2).

In the illustrated embodiment of FIG. 3, the controller 134 is configured to control the single delivery valve 120, such that the selected tank 114, i.e., one of the first tank 114-1, the second tank 114-2, and the third tank 114-3 is fluidly coupled with the first nozzle 118-1, the second nozzle 118-2, and the third nozzle 118-3.

The controller 134 is further configured to control the single recovery valve 126, such that the single recovery valve allows the flow of the corresponding fluid 116 collected at the two ports 324-1, 324-2 to the selected tank 114, i.e., the first fluid 116-1 to the first tank 114-1, the second fluid 116-2 to the second tank 114-2, and the third fluid 116-3 to the third tank 114-3.

Figure 5:
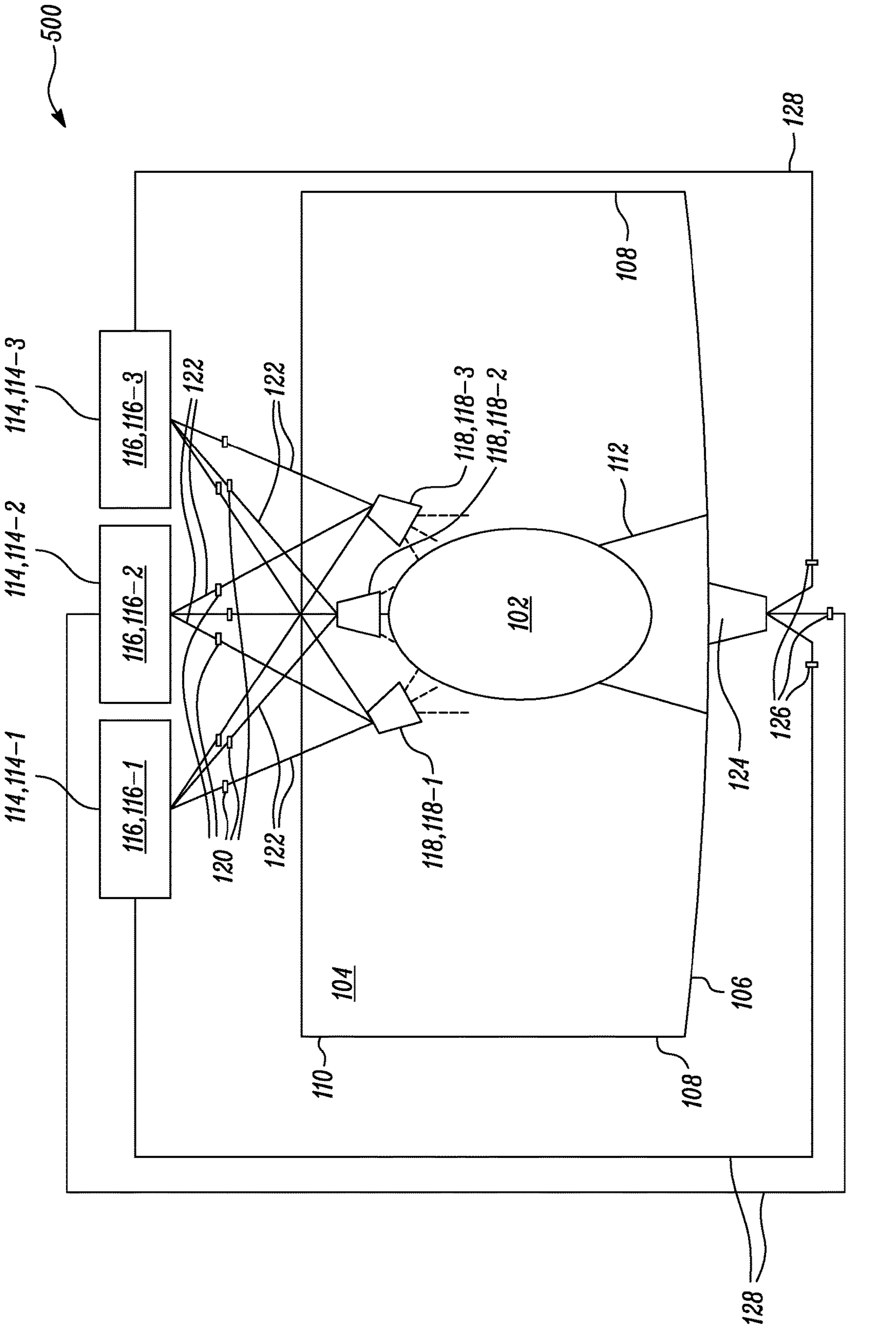
FIG. 5 is a schematic front view of a system for the wet treatment of the at least one component, according to yet another embodiment of the present disclosure.

FIG. 5 illustrates a schematic front view of a system 500 for the wet treatment of the at least one component 102, according to yet another embodiment of the present disclosure. The system 500 illustrated in FIG. 5 is substantially similar and functionally equivalent to the system 100 illustrated in FIG. 1, with common components being referred to by the same reference numerals. However, the at least one delivery valve 120 of the system 500 includes the plurality of delivery valves 120 corresponding to the plurality of delivery conduits 122 (instead of three delivery valves 120 corresponding to the first nozzle 118-1, the second nozzle 118-2, and the third nozzle 118-3 of the system 100 of FIG. 1). Each delivery valve 120 from the plurality of delivery valves 120 is configured to selectively fluidly couple the corresponding delivery conduit 122 to the at least one nozzle 118. The system 500 may include the syphon 130 which is not shown in FIG. 5 for the purpose of clarity.

Further, the at least one recovery valve 126 of the system 500 includes a plurality of recovery valves 126 corresponding to the plurality of recovery conduits 128. In the illustrated embodiment of FIG. 5, three recovery valves 126 are illustrated corresponding to three recovery conduits 128. Each recovery valve 126 from the plurality of recovery valves 126 is configured to selectively fluidly couple the corresponding recovery conduit 128 to the at least one port 124.

Figure 6:
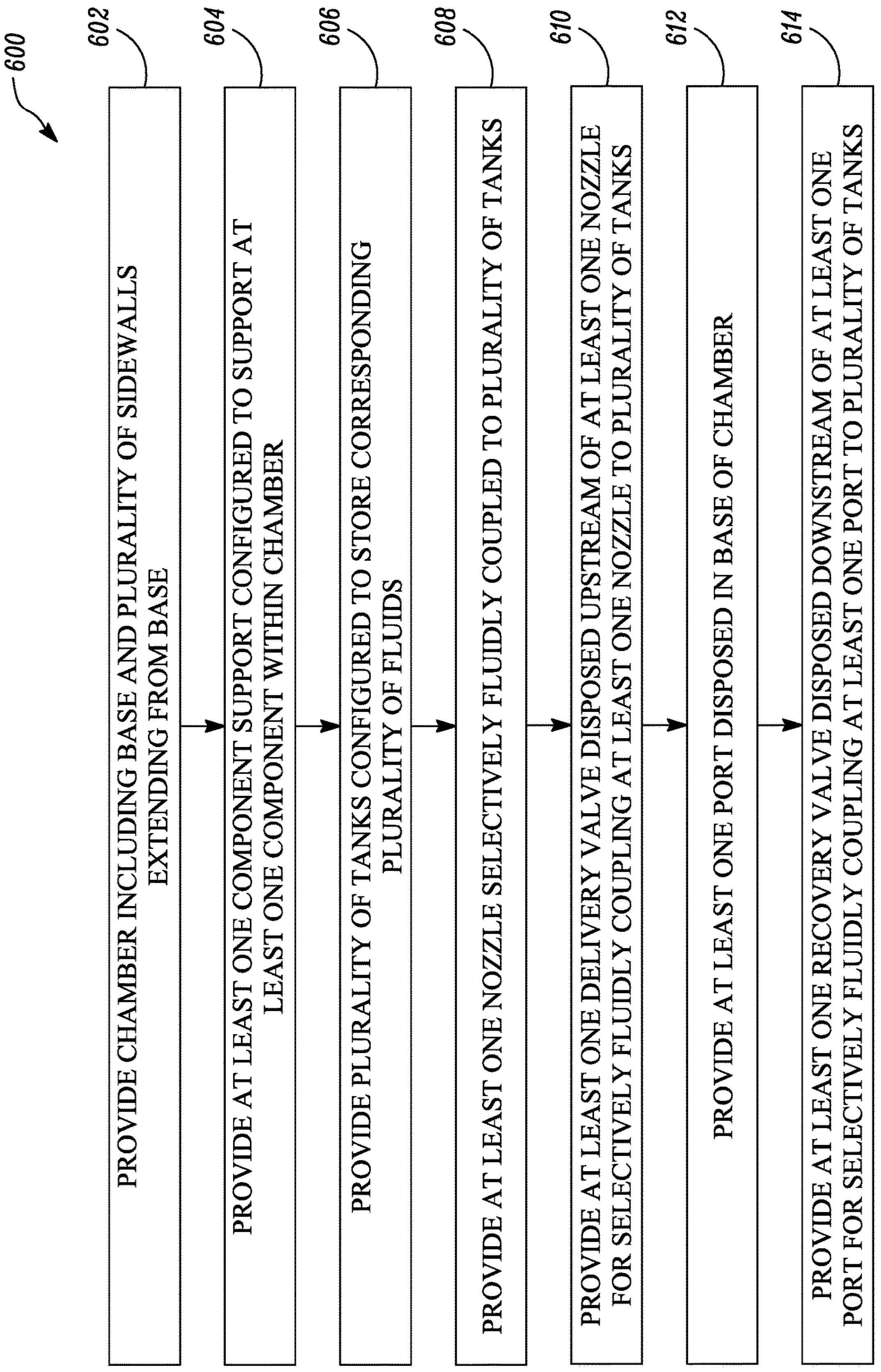
FIG. 6 is a flow chart for a method for the wet treatment of the at least one component, according to another embodiment of the present disclosure.

FIG. 6 illustrates a flow chart for a method 600 for the wet treatment of the at least one component 102 (shown in FIG. 1), according to an embodiment of the present disclosure. The method 600 will be described with reference to FIG. 1 to FIG. 5.

At step 602, the method 600 includes providing the chamber 104 including the base 106 and the plurality of sidewalls 108 extending from the base 106. The chamber 104 is configured to receive and at least partially enclose the at least one component 102.

At step 604, the method 600 includes providing the at least one component support 112 configured to support the at least one component 102 within the chamber 104.

At step 606, the method 600 includes providing the plurality of tanks 114 configured to store the corresponding plurality of fluids 116.

At step 608, the method 600 includes providing the at least one nozzle 118 selectively fluidly coupled to the plurality of tanks 114. The at least one nozzle 118 is at least partially disposed within the chamber 104. The at least one nozzle 118 is configured to spray the fluid 116 towards the at least one component 102.

In some embodiments, the method 600 further includes selecting which of the plurality of tanks 114 to selectively couple with the at least one nozzle 118 based on the predetermined sequence.

In some embodiments, the method 600 further includes heating and storing the corresponding fluid 116 before the at least one nozzle 118 sprays the corresponding fluid 116 stored in the selected tank 114 towards the at least one component 102.

In some embodiments, the method 600 further includes controlling the at least one nozzle 118, such that the at least one nozzle 118 sprays the corresponding fluid stored in the selected tank 114 towards the at least one component 102. In some embodiments, the method 600 further includes controlling one or more parameters of the at least one nozzle 118. The one or more parameters include at least one of the fluid flow rate of the at least one nozzle 118, the fluid pressure of the at least one nozzle 118, the opening period of the at least one nozzle 118, and the droplet size of the at least one nozzle 118.

In some embodiments, the method 600 further includes controlling the at least one component support 112 to move the at least one component 102 within the chamber 104 while the at least one nozzle 118 sprays the corresponding fluid stored in the selected tank towards the at least one component 102.

At step 610, the method 600 includes providing the at least one delivery valve 120 disposed upstream of the at least one nozzle 118 for selectively fluidly coupling the at least one nozzle 118 to the plurality of tanks 114.

In some embodiments, the method 600 further includes controlling the at least one delivery valve 120, such that the selected tank 114 is fluidly coupled with the at least one nozzle 118.

In some embodiments, the method 600 further includes providing the plurality of delivery conduits 122 corresponding to the plurality of tanks 114. Each of the plurality of delivery conduits 122 fluidly couples the corresponding tank 114 to the at least one delivery valve 120.

With reference to FIG. 3, in some embodiments, the at least one delivery valve 120 includes the single delivery valve 120. Controlling the at least one delivery 120 valve further includes controlling the single delivery valve 120 to selectively fluidly couple each of the plurality of delivery conduits 122 to the at least one nozzle 118.

With reference to FIG. 5, in some embodiments, the at least one delivery valve 120 includes the plurality of delivery valves 120 corresponding to the plurality of delivery conduits 122. Controlling the at least one delivery valve 120 further includes controlling each delivery valve 120 from the plurality of delivery valves 120 to selectively fluidly couple the corresponding delivery conduit 122 to the at least one nozzle 118.

At step 612, the method 600 further includes providing the at least one port 124 disposed in the base 106 of the chamber 104. The at least one port 124 is configured to collect the fluid 116 sprayed by the at least one nozzle 118.

In some embodiments, the method 600 further includes removing the corresponding fluid 116 sprayed by the at least one nozzle 118 from the at least one component 102. In some embodiments, the method 600 further includes transporting the corresponding fluid 116 removed from the at least one component 102 to the at least one port 124.

At step 614, the method 600 further includes providing the at least one recovery valve 126 disposed downstream of the at least one port 124 for selectively fluidly coupling the at least one port 124 to the plurality of tanks 114.

In some embodiments, the method 600 further includes controlling the at least one recovery valve 126, such that the at least one recovery valve 126 allows the flow of the corresponding fluid 116 collected at the at least one port 124 to the selected tank 114.

In some embodiments, the method 600 further includes providing the plurality of recovery conduits 128 corresponding to the plurality of tanks 114. Each of the plurality of recovery conduits 128 fluidly couples the at least one recovery valve 126 to the corresponding tank 114.

With reference to FIG. 3, in some embodiments, the at least one recovery valve 126 includes the single recovery valve 126. Controlling the at least one recovery valve 126 further includes controlling the single recovery valve 126 to selectively fluidly couple each of the plurality of recovery conduits 128 to the at least one port 124.

With reference to FIG. 5, in some embodiments, the at least one recovery valve 126 includes the plurality of recovery valves 126 corresponding to the plurality of recovery conduits 128. Controlling the at least one recovery valve 126 further includes controlling each recovery valve 126 from the plurality of recovery valves 126 to selectively fluidly couple the corresponding recovery conduit 128 to the at least one port 124.

It will be understood that the invention is not limited to the embodiments above described and various modifications and improvements can be made without departing from the concepts described herein. Except where mutually exclusive, any of the features may be employed separately or in combination with any other features and the disclosure extends to and includes all combinations and sub-combinations of one or more features described herein.

I claim:

1. A system for wet treatment of at least one component, the system comprising:
- a chamber comprising a base and a plurality of sidewalls extending from the base, wherein the chamber is configured to receive and at least partially enclose the at least one component;
- at least one component support configured to support the at least one component within the chamber;
- a plurality of tanks configured to store a corresponding plurality of fluids;
- at least one nozzle selectively fluidly coupled to the plurality of tanks, wherein the at least one nozzle is at least partially disposed within the chamber, and wherein the at least one nozzle is configured to spray a fluid towards the at least one component;
- at least one delivery valve disposed upstream of the at least one nozzle for selectively fluidly coupling the at least one nozzle to the plurality of tanks;
- at least one port disposed in the base of the chamber, wherein the at least one port is configured to collect the fluid sprayed by the at least one nozzle;
- at least one recovery valve disposed downstream of the at least one port for selectively fluidly coupling the at least one port to the plurality of tanks;
- at least one syphon conduit disposed inside the chamber and configured to remove the corresponding fluid sprayed by the at least one nozzle from the at least one component, and wherein the at least one syphon conduit is further configured to transport the corresponding fluid removed from the at least one component to the at least one port or one of the plurality of tanks;
- wherein at least one of the at least one syphon conduits is one of the at least one nozzles; and
- a controller communicably coupled to each of the at least one nozzle, the at least one delivery valve, and the at least one recovery valve.

2. The system of claim 1, wherein the controller is configured to:
- select which of the plurality of tanks to selectively couple with the at least one nozzle based on a predetermined sequence;
- control the at least one delivery valve, such that the selected tank is fluidly coupled with the at least one nozzle;
- control the at least one nozzle, such that the at least one nozzle sprays the corresponding fluid stored in the selected tank towards the at least one component; and
- control the at least one recovery valve, such that the at least one recovery valve allows a flow of the corresponding fluid collected at the at least one port to the selected tank.

3. The system of claim 1, further comprising:
- a plurality of delivery conduits corresponding to the plurality of tanks, wherein each of the plurality of delivery conduits fluidly couples the corresponding tank to the at least one delivery valve; and
- a plurality of recovery conduits corresponding to the plurality of tanks, wherein each of the plurality of recovery conduits fluidly couples the at least one recovery valve to the corresponding tank.

4. The system of claim 3, wherein:
- the at least one delivery valve comprises a single delivery valve configured to selectively fluidly couple the plurality of delivery conduits to the at least one nozzle; and
- the at least one recovery valve comprises a single recovery valve configured to selectively fluidly couple the plurality of recovery conduits to the at least one port.

5. The system of claim 3, wherein:
- the at least one delivery valve comprises a plurality of delivery valves corresponding to the plurality of delivery conduits, and wherein each delivery valve from the plurality of delivery valves is configured to selectively fluidly couple the corresponding delivery conduit to the at least one nozzle; and
- the at least one recovery valve comprises a plurality of recovery valves corresponding to the plurality of recovery conduits, and wherein each recovery valve from the plurality of recovery valves is configured to selectively fluidly couple the corresponding recovery conduit to the at least one port.

6. The system of claim 1, wherein the controller is communicably coupled to the at least one component support, and wherein the controller is further configured to control the at least one component support to move the at least one component within the chamber while the at least one nozzle sprays the corresponding fluid stored in the selected tank towards the at least one component.

7. The system of claim 1, wherein the base is inclined towards the at least one port.

8. The system of claim 1, wherein the controller is further configured to control one or more parameters of the at least one nozzle, and wherein the one or more parameters comprise at least one of a fluid flow rate of the at least one nozzle, a fluid pressure of the at least one nozzle, an opening period of the at least one nozzle, and a droplet size of the at least one nozzle.

9. The system of claim 1, wherein the at least one nozzle comprises a plurality of nozzles, and wherein the plurality of nozzles follows a profile of the at least one component.

10. The system of claim 1, further comprising a heating device disposed upstream of the at least one nozzle, wherein the heating device is configured to heat and store the corresponding fluid before the at least one nozzle sprays the corresponding fluid stored in the selected tank towards the at least one component.

11. A method for wet treatment of at least one component, the method comprising the steps of:
- providing a chamber comprising a base and a plurality of sidewalls extending from the base, wherein the chamber is configured to receive and at least partially enclose the at least one component;
- providing at least one component support configured to support the at least one component within the chamber;

providing a plurality of tanks configured to store a corresponding plurality of fluids;

providing at least one nozzle selectively fluidly coupled to the plurality of tanks, wherein the at least one nozzle is at least partially disposed within the chamber, and wherein the at least one nozzle is configured to spray a fluid towards the at least one component;

providing at least one delivery valve disposed upstream of the at least one nozzle for selectively fluidly coupling the at least one nozzle to the plurality of tanks;

providing at least one port disposed in the base of the chamber, wherein the at least one port is configured to collect the fluid sprayed by the at least one nozzle; and providing at least one recovery valve disposed downstream of the at least one port for selectively fluidly coupling the at least one port to the plurality of tanks;

providing at least one syphon conduit disposed within the chamber;

reversing at least one of the at least one nozzles to function as at least one of the at least one syphon conduits;

removing the corresponding fluid sprayed by the at least one nozzle from the at least one component using the at least one syphon conduit; and transporting the corresponding fluid removed from the at least one component to the at least one port or to one of the plurality of tanks.

12. The method of claim 11, further comprising:

selecting which of the plurality of tanks to selectively couple with the at least one nozzle based on a predetermined sequence;

controlling the at least one delivery valve, such that the selected tank is fluidly coupled with the at least one nozzle;

controlling the at least one nozzle, such that the at least one nozzle sprays the corresponding fluid stored in the selected tank towards the at least one component; and controlling the at least one recovery valve, such that the at least one recovery valve allows a flow of the corresponding fluid collected at the at least one port to the selected tank.

13. The method of claim 12, further comprising:

providing a plurality of delivery conduits corresponding to the plurality of tanks, wherein each of the plurality of delivery conduits fluidly couples the corresponding tank to the at least one delivery valve; and providing a plurality of recovery conduits corresponding to the plurality of tanks, wherein each of the plurality of recovery conduits fluidly couples the at least one recovery valve to the corresponding tank.

14. The method of claim 13, wherein:

the at least one delivery valve comprises a single delivery valve, and wherein controlling the at least one delivery valve further comprises controlling the single delivery valve to selectively fluidly couple each of the plurality of delivery conduits to the at least one nozzle; and the at least one recovery valve comprises a single recovery valve, and wherein controlling the at least one recovery valve further comprises controlling the single recovery valve to selectively fluidly couple each of the plurality of recovery conduits to the at least one port.

15. The method of claim 13, wherein:

the at least one delivery valve comprises a plurality of delivery valves corresponding to the plurality of delivery conduits, and wherein controlling the at least one delivery valve further comprises controlling each delivery valve from the plurality of delivery valves to selectively fluidly couple the corresponding delivery conduit to the at least one nozzle; and the at least one recovery valve comprises a plurality of recovery valves corresponding to the plurality of recovery conduits, and wherein controlling the at least one recovery valve further comprises controlling each recovery valve from the plurality of recovery valves to selectively fluidly couple the corresponding recovery conduit to the at least one port.

16. The method of claim 11, further comprising controlling the at least one component support to move the at least one component within the chamber while the at least one nozzle sprays the corresponding fluid stored in the selected tank towards the at least one component.

17. The method of claim 11, further comprising controlling one or more parameters of the at least one nozzle, wherein the one or more parameters comprise at least one of a fluid flow rate of the at least one nozzle, a fluid pressure of the at least one nozzle, an opening period of the at least one nozzle, and a droplet size of the at least one nozzle.

18. The method of claim 11, further comprising heating and storing the corresponding fluid before the at least one nozzle sprays the corresponding fluid stored in the selected tank towards the at least one component.

* * * * *